(12) United States Patent
Aronson et al.

(10) Patent No.: US 6,944,587 B2
(45) Date of Patent: Sep. 13, 2005

(54) ETHERNET ADAPTING APPARATUS

(75) Inventors: Simcha Aronson, Sunnyville, CA (US); Shai Lazmi, Sderot (IL); Amnon Harpak, Holon (IL)

(73) Assignee: Infineon Technologies AG, München (DE)

(*) Notice: Subject to any disclaimer, the term of this patent is extended or adjusted under 35 U.S.C. 154(b) by 515 days.

(21) Appl. No.: 09/999,102

(22) Filed: Oct. 31, 2001

(65) Prior Publication Data

US 2002/0150107 A1 Oct. 17, 2002

(30) Foreign Application Priority Data

Jan. 5, 2001 (DE) .......................... 101 00 363

(51) Int. Cl.[7] ................ G06F 9/445; H04L 12/413; H04L 1/00
(52) U.S. Cl. ................ 703/27; 370/445; 370/480
(58) Field of Search .............. 703/27; 370/445, 370/480

(56) References Cited

U.S. PATENT DOCUMENTS

| | | | |
|---|---|---|---|
| 5,892,768 A | 4/1999 | Jeng | |
| 5,963,539 A | * 10/1999 | Webber et al. | 370/213 |
| 6,088,368 A | * 7/2000 | Rubinstain et al. | 370/480 |
| 6,094,439 A | 7/2000 | Krishna et al. | |

FOREIGN PATENT DOCUMENTS

| | | |
|---|---|---|
| EP | 0963080 A2 | 12/1999 |
| WO | WO 9851044 A1 | 11/1998 |
| WO | WO99/01007 | 1/1999 |
| WO | WO00/30317 A1 | 5/2000 |

* cited by examiner

*Primary Examiner*—Kevin J. Teska
*Assistant Examiner*—Dwin M. Craig
(74) *Attorney, Agent, or Firm*—Jenkins, Wilson & Taylor, P.A.

(57) ABSTRACT

An Ethernet adapting apparatus for data transfer between a standard Ethernet data pump and an Ethernet medium access controller via telecommunication medium (4), comprising:
(a) a dual mode media independent interface (9) which emulates in a PHY mode the standard Ethernet data pump and which emulates in a MAC mode the Ethernet medium access controller;
(b) a data pump (10) connected to the telecommunication medium (4);
(c) a data buffer (11) for storing at least one Ethernet data package to be transferred between the standard Ethernet data pump and the Ethernet medium access controller.

9 Claims, 13 Drawing Sheets

| SYNC | HEADER | MESSAGE | PAYLOAD | FEC | 10 BASE S DATA FRAME |
|---|---|---|---|---|---|

Fig. 1

(PRIOR ART)

Fig. 2

(PRIOR ART)

Fig. 3

(PRIOR ART)

Fig. 4

(PRIOR ART)

ETHERNET ADAPTING APPARATUS

TECHNICAL FIELD

The present invention refers to an Ethernet adapting apparatus for data transfer between a standard Ethernet data pump and an Ethernet medium access controller (MAC) via a telecommunication medium, and in particular via a telephone line.

RELATED ART

Figure 1:
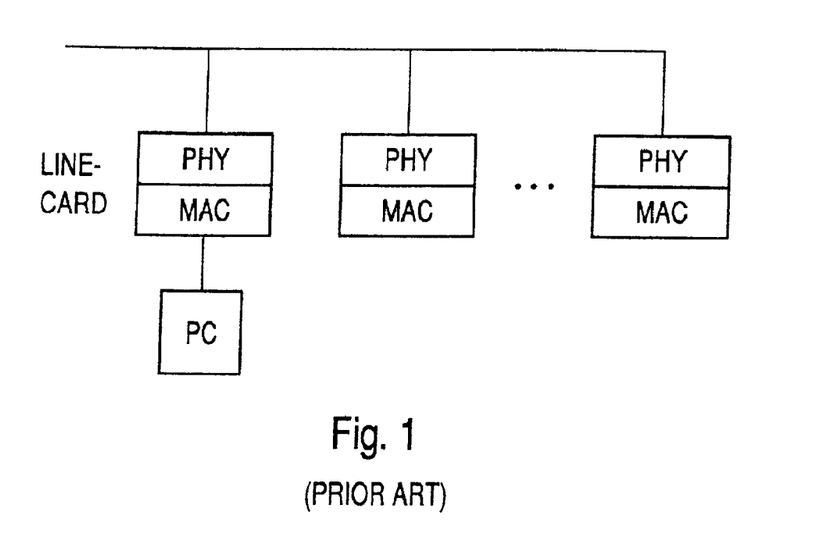
FIG. 1 a first Ethernet architecture according to the state of the art.

Ethernet began as a shared media network architecture. Line-cards of a PC are connected to an Ethernet data transfer cable as shown in FIG. 1. In the architecture shown in FIG. 1, only half duplex data transfer is possible. Further, no auto-negotiation procedures between the different line-cards can be performed.

Figure 2:
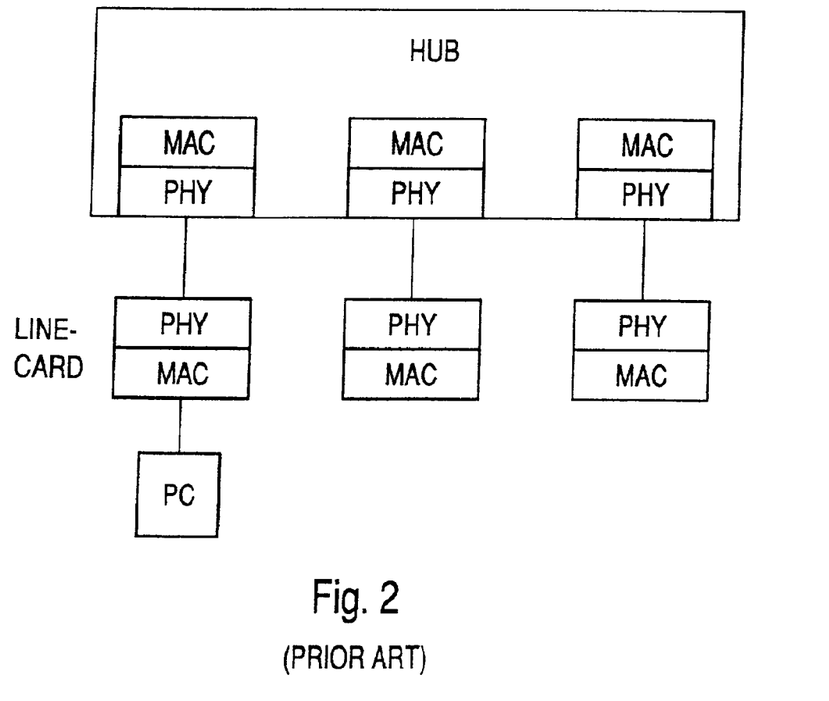
FIG. 2 a second Ethernet architecture according to the state of the art.

FIG. 2 shows a further Ethernet architecture with a HUB device. A HUB is a component that serves as a common termination point for multiple nodes and can relay signals along appropriate signal paths. A HUB connects nodes that have a common architecture, such as Ethernet. In the architecture shown in FIG. 2, all data coming from one line-card are sent to all other line-cards comprising a physical layer PHY and a MAC layer (MAC). In the architecture shown in FIG. 2, only half duplex data transmission is possible. Further auto-negotiation procedures can be performed.

Figure 3:
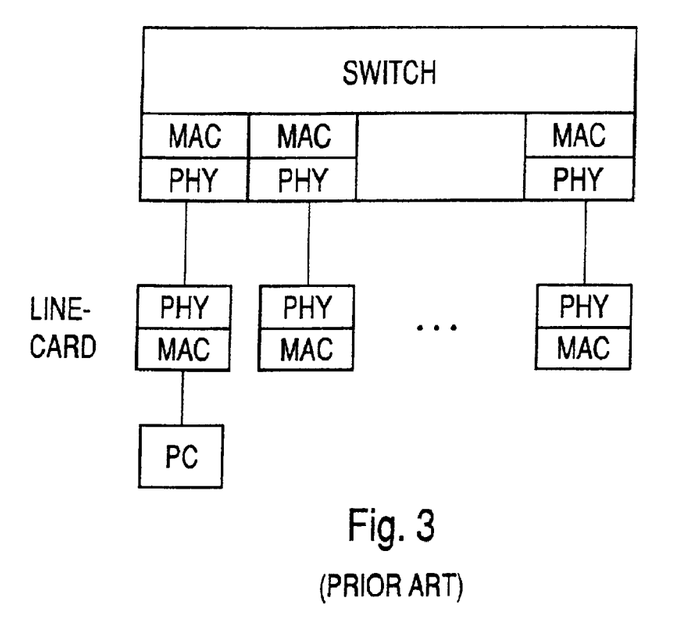
FIG. 3 a third Ethernet architecture according to the state of the art.

FIG. 3 shows an Ethernet architecture with a switch known in the state of the art. An Ethernet switch is a device that can direct network traffic among several Ethernet networks or PCs. The switch has multiple ports to connect the subnetworks, and it generally has multiple processors to handle the data traffic through the switch. Two types of Ethernet switches are common. The store-and-forward switch checks each data packet for errors before directing it to the appropriate network. In contrast, a cross-point switch directs packets without checking for errors. This type of switch is generally much faster than a store-and-forward switch, because no time-consuming error check is performed. In the architecture shown in FIG. 3, full duplex data transmission is possible as well as auto-negotiation procedures.

Figure 4:
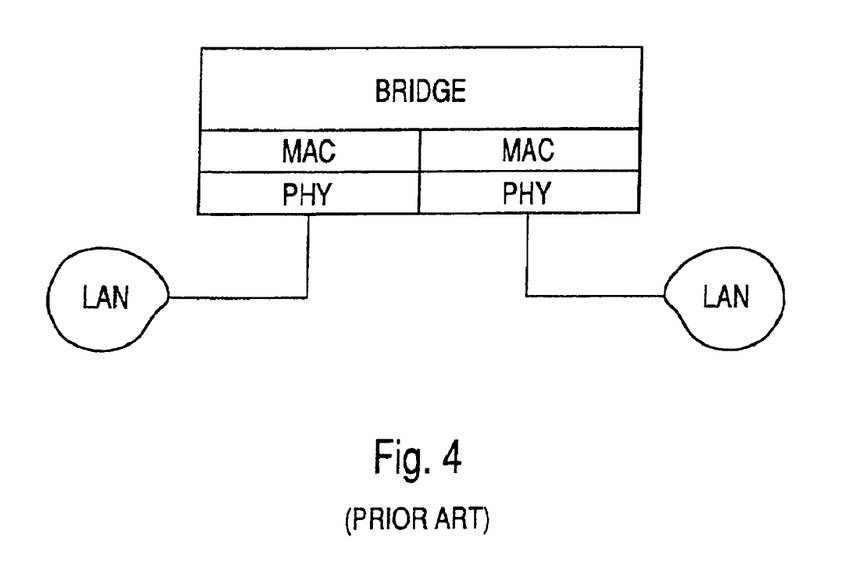
FIG. 4 a fourth Ethernet architecture according to the state of the art.

FIG. 4 shows a bridge connecting two local area networks (LAN). The bridge is a hardware device that can pass data packets from one local area network to the other local area network. The bridge makes the networks look like a single network to higher level protocols or programs. Depending on the architecture of the local area network, full duplex data transmission and auto-negotiation is possible.

In many applications, it is necessary to connect an Ethernet network to a remote Ethernet network.

Figure 5:
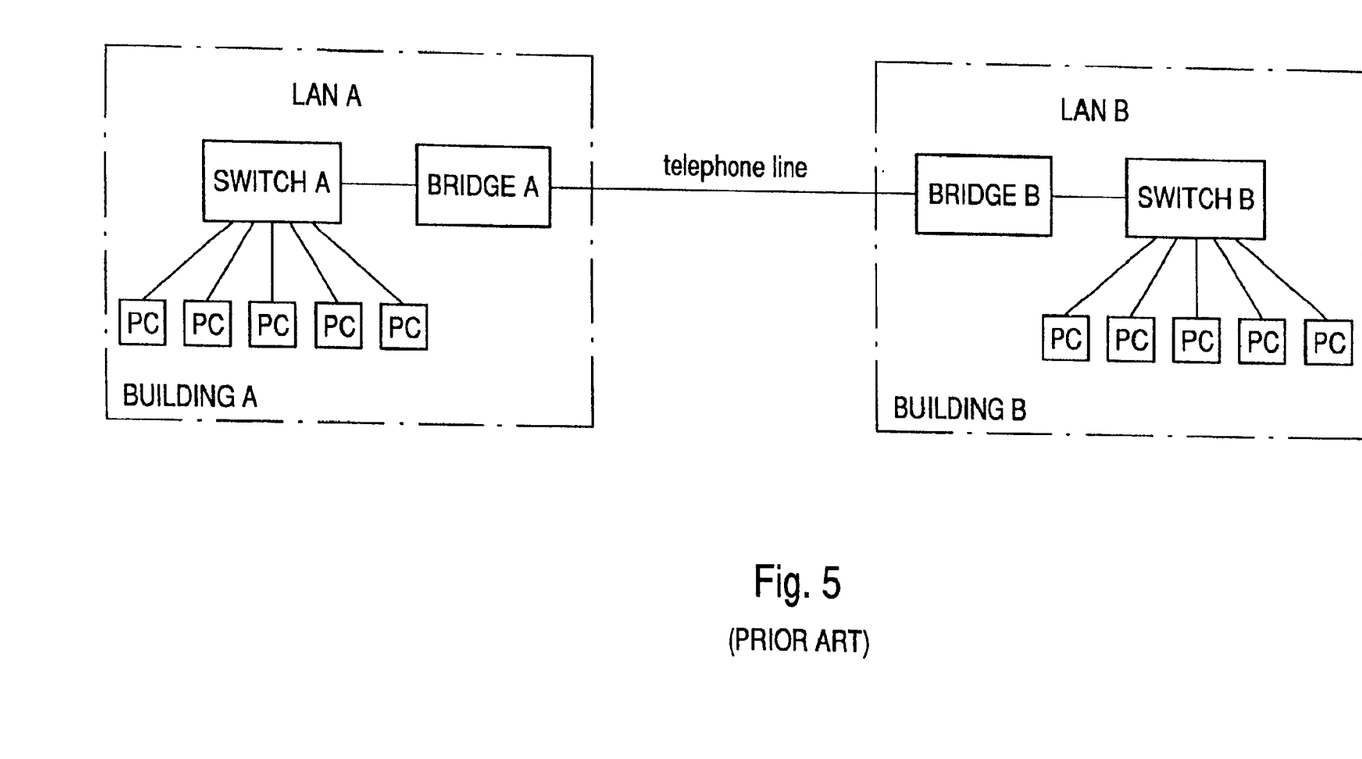
FIG. 5 the connection between two Ethernet local area networks according to the state of the art showing the problem underlying the present invention.

FIG. 5 shows an example connecting the first Ethernet local area network (LANA) in a first building A to a remote second Ethernet network (LANB) in a building B. Since the maximum distance between two PCs or switches in an Ethernet network is about 100 meters, it is necessary to connect both LANs via two bridges A, B and a telecommunication channel, e.g. a telephone line. The maximum distance between two computers within an Ethernet network is about 100 meters, because the resistance and accordingly the attenuation of an Ethernet cable connecting two Ethernet devices can be intolerable for higher distances.

The standard Ethernet networks LANA, LANB have the following characteristics. The Ethernet network operates at the two lowest layers in the OSI reference model, i.e. as a physical and data link layer. The Ethernet networks use a bus topology. Nodes are attached to a trunk segment which is a main piece of cable in an Ethernet network. 10BaseT, a variant architecture based on the IEEE 802.3 standard, can also use a star topology. 100BaseT networks must use a star topology according to IEEE 802.3 U specifications. Ethernet networks operate usually at speeds of up to 10 Mbps. Several variants of the Ethernet network operate at slower speeds, and new variants of Ethernet networks operate even at 100 Mbps and 1 Gbps, respectively. Ethernet networks use CSMA/CD, i.e. immediate access method based on collision detection. This access method is specified as part of the IEEE 802.3 standard. An Ethernet network broadcasts transmissions, so that each node receives the transmission at the same time. Further, Ethernet networks use Manchester encoding, which is a self-clocking encoding method that includes a voltage transition in the middle of each bit interval. Normally, 50 Ω coaxial cables are used in an Ethernet network, however, variant networks can also use 75 Ω coaxial cables, twisted pair and fiber optic cables. The frame sizes vary between 64 and 15/8 data bytes. Variants of the Ethernet networks are the 10Base5 (thick Ethernet), the 10Base2 (thin Ethernet), the 10BaseT (twisted pair Ethernet), the 10BaseF (fiber optic Ethernet), the 10Broad36 and the 100 Base T.

The 10BaseT Ethernet uses UTP cables. This configuration was adopted as the 802.3 I standard in 1990 and is becoming increasingly popular, because UTP is inexpensive and easy to install and work with. The maximum cable segment length is about 100 meters.

A disadvantage of the system shown in FIG. 5 resides in that there is only one data transmission channel between the two local area networks LANA, LANB. This significates that only one Ethernet data frame can be sent from one local area network to the other local area network at a time via the telephone line. Consequently, the data transfer speed for data transfer from one local area network to the other local area network is very slow. A further disadvantage is that two bridge devices are necessary to connect both local area networks.

SUMMARY OF THE INVENTION

Accordingly, it is the object of the present invention to provide an Ethernet adapting apparatus for data transfer which makes it possible to extend an Ethernet local area network to remote locations without reducing the data transfer speed.

This object is solved by an Ethernet adapting apparatus for data transfer having the features of main claim 1.

The present invention provides an Ethernet adapting apparatus for data transfer between a standard Ethernet data pump and a Ethernet medium access controller via telecommunication medium, comprising
a dual-mode media independent interface (MII) which emulates in a PHY mode the standard Ethernet data pump and which emulates in a MAC mode the Ethernet medium access controller (MAC),
a data pump connected to the telecommunication medium, and
a data buffer for storing at least one Ethernet data package to be transferred between the standard Ethernet data pump and the Ethernet medium access controller.

According to a preferred embodiment, the telecommunication medium is a telephone line.

The data pump is preferably a 10BASES®.

In a preferred embodiment of the Ethernet adapting apparatus according to the present invention, the dual-mode media independent interface is set to the PHY mode or to the MAC mode by means of a switching device.

The dual-mode media independent interface comprises in a preferred embodiment
a serial management interface (SMI) connectable via a SMI data line to an Ethernet medium access controller (MAC) or to
a standard Ethernet data pump for the exchange of SMI data frames including SMI messages, and
a data flow interface (DFI) connectable via a data bus to an Ethernet medium access controller (MAC) or to a standard Ethernet data pump for the exchange of Ethernet data packages.

The serial management interface (SMI) comprises in a preferred embodiment a deframing circuit for deframing the SMI-data frames supplied via the SMI-data line,
a decoder for decoding the SMI messages, and
a set of SMI-registers.

These SMI-registers are in a preferred embodiment a command register, a status register, an identification code register, a negotiation advertisement register and an auto-negotiation partner ability register.

In an alternative embodiment the SMI comprises an encoder for encoding SMI messages and a framing circuit for framing SMI data frames to be supplied through the SMP data line to an Ethernet data pump.

The serial management interface (SMI) is in a preferred embodiment connected to a central processing unit (CPU) of the Ethernet adapting apparatus.

The data-flow interface (DFI) is connected in a preferred embodiment via control lines to a data buffer control circuit for controlling the data buffer.

In an alternative embodiment, the telecommunication medium is a wireless telecommunication channel.

In a further alternative embodiment, the telecommunication medium is an optical telecommunication channel.

BRIEF DESCRIPTION OF THE INVENTION

In a preferred embodiment of the Ethernet adapting apparatus for data transfer between a standard Ethernet data pump and an Ethernet medium access controller are described with reference to the enclosed Figures which show.

DETAILED DESCRIPTION OF THE INVENTION

Figure 6:
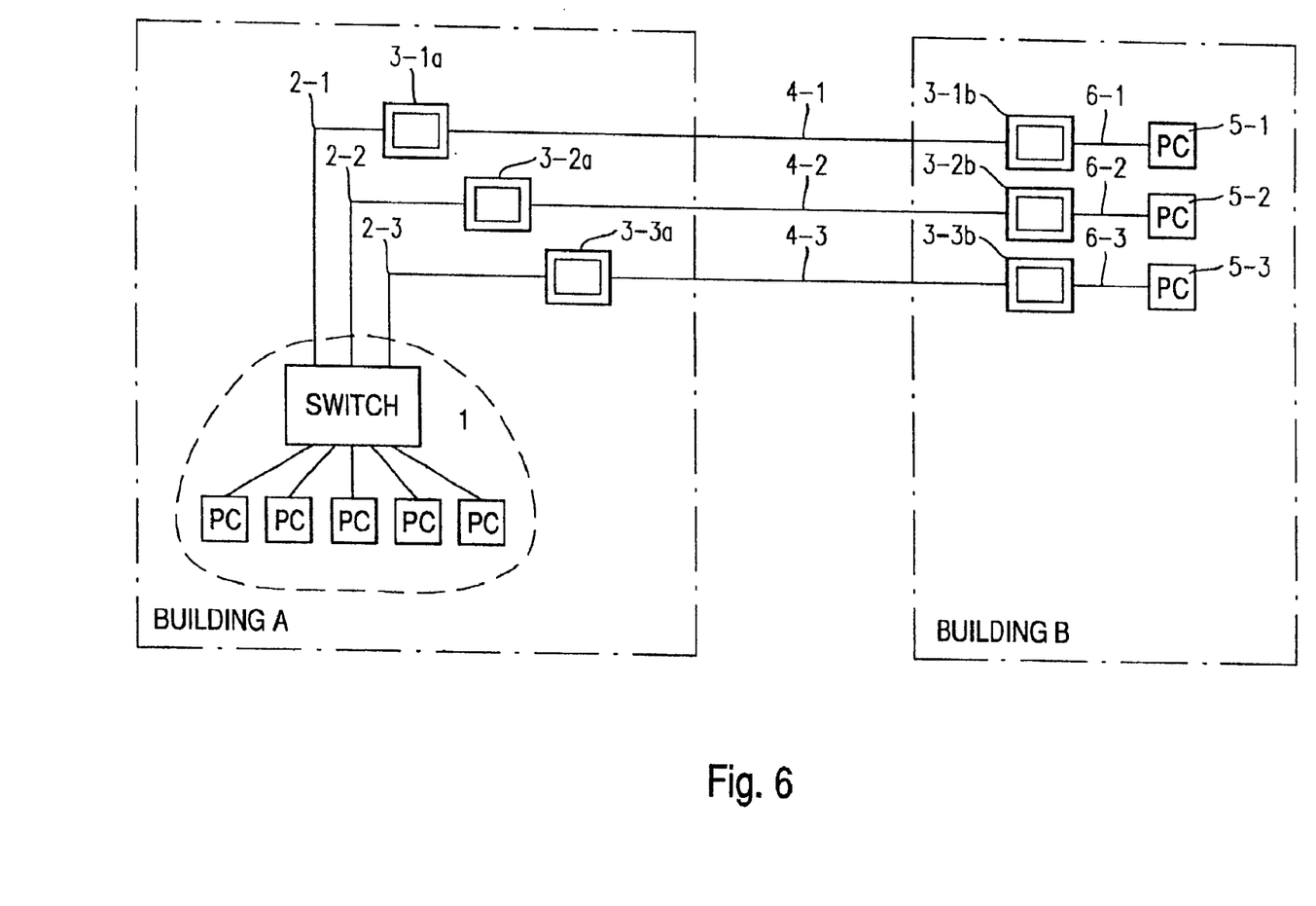
FIG. 6 the extension of an Ethernet local area network using several Ethernet adapting apparatuses according to the present invention.

As can be seen from FIG. 6, an Ethernet local area network 1 including, for example, a switch and several PCs within a building A is connected via lines 2-1, 2—2, 2-3 to the Ethernet adapting apparatuses 3-1a, 3-2a, 3-3a within the same building. Each Ethernet adapting apparatus is connected via a corresponding telephone line 4-1, 4-2, 4-3 to a remote Ethernet adapting apparatus 3-1b, 3-2b, 3-3b in a different building B. In the example shown in FIG. 6, each remote Ethernet adapting apparatus 3-1b, 3-2b, 3-3b of a computer 5-1, 5-2, 5-3 is connected by means of a line 6-1, 6-2, 6-3.

The Ethernet adapting apparatuses 3-1a, 3-2a, 3-3a within building A are set in a physical PHY mode to emulate the standard Ethernet data pump, whereas the remote Ethernet adapting apparatuses 3-1b, 3-2b, 3-3b within building B are set to a MAC mode for emulating an Ethernet medium access controller. Two Ethernet adapting apparatuses according to the present invention connected via a telecommunication medium such as a telephone line are set in different operating modes. The operating mode of an Ethernet adapting apparatus 3 according to the present invention is preferably set by a switching device of the Ethernet adapting apparatus, such as a hardware pin. In an alternative embodiment, the Ethernet adapting apparatus 3 of the present invention is switched between two modes by a control signal applied via control line from a remote control unit or by Ethernet commands.

Figure 7:
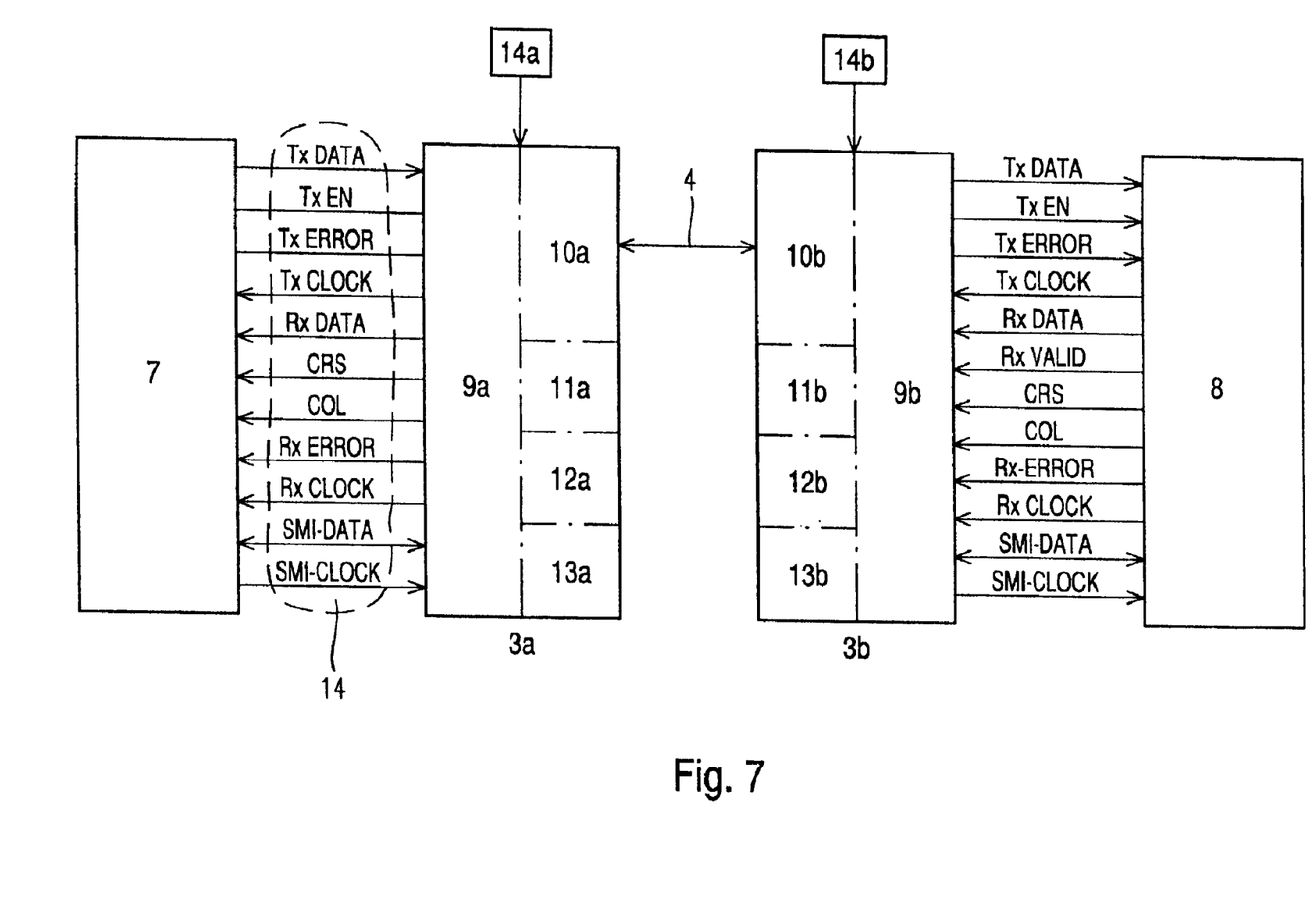
FIG. 7 the connection of a medium access controller (MAC) and a standard Ethernet data pump by means of two Ethernet adapting apparatuses and a telephone line according to the present invention.

FIG. 7 shows the connection of an Ethernet medium access controller, such as a switch, a bridge or a HUB device 7 to a standard Ethernet data pump 8 by means of two Ethernet adapting apparatuses 3a, 3b and a telephone line 4 in more detail.

Each Ethernet adapting apparatus 3 comprises an MII interface 9, a data pump 10, a data buffer 11, a buffer control circuit 12 and a central processing unit 13. The two data pumps 10a, 10b of the Ethernet adapting apparatus 3a, 3b are connected to each other via the telephone line 4. The first Ethernet adapting apparatus 3a shown in FIG. 7 is set to the physical mode by means of a switching device 14a, and the other Ethernet adapting apparatus 3b is set to the MAC mode by means of a switching device 14b.

The first Ethernet adapting apparatus 3a emulates the standard Ethernet data pump and is connected via control and data lines to the medium access controlling device 7, such as a switch, a bridge or a HUB. On the other side, the second Ethernet adapting apparatus 3b operates in the MAC mode and emulates an Ethernet medium access controller. The MII interface 9b of the second Ethernet adapting apparatus 3b is connected via data and control lines to a standard Ethernet data pump 8.

From the view point of the medium access controller 7, the two Ethernet adapting apparatuses 3a, 3b connected to the standard Ethernet data pump 8 behave like a normal standard Ethernet data pump, i.e. the medium access controller 7 does not realize that a telephone line 4 which may have a distance of up to 1 mile is located between the remote standard Ethernet data pump and the medium access controller 7.

From the view point of the standard Ethernet data pump 8, the MAC controller 7 and the two Ethernet adapting apparatuses 3a, 3b behave like a normal standard Ethernet medium access controller. Accordingly, by using the two Ethernet adapting apparatuses 3a, 3b according to the present invention, it is possible to achieve complete transparency between a medium access controller 7 and the standard Ethernet data pump 8.

The computers 5-1, 5-2, 5-3 shown in FIG. 6 in building B behave like ordinary PCs in the local area network 1 implemented in building A.

Figure 8:
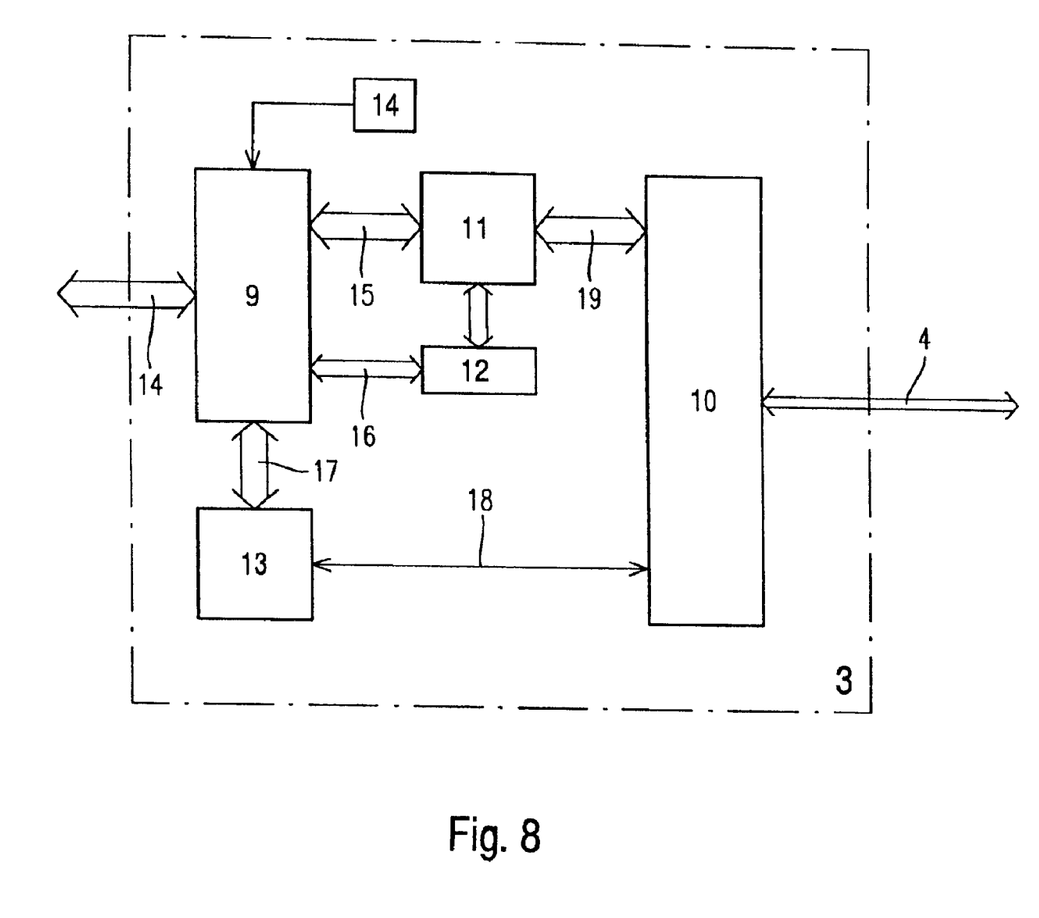
FIG. 8 a block diagram of an Ethernet adapting apparatus according to the present invention.

FIG. 8 shows a block diagram of an Ethernet adapting apparatus 3 according to the present invention. The Ethernet adapting apparatus 3 comprises a dual-mode media independent interface 9, a data pump 10, a data buffer 11, a data buffer control circuit 12 and a central processing unit 13. The dual-mode media independent interface 9 is connectable via data and control lines 14 to a medium access controller. The data pump 10 is connected to the telecommunication medium, such as a telephone line. In an alternative embodiment, the telecommunication medium 4 may be a wireless telecommunication channel or an optical telecommunication channel. The medium independent interface 9 is connected via data lines 15 to the data buffer 11 and via control lines 16 to the data buffer control circuit 12. The dual-mode media independent interface 9 is further connected to the central processing unit 13 via data control lines 17. The two modes of the dual-mode media independent interface are set by a switching device 14, such as a hardware pin. The central processing unit 13 is connected via data and control lines 18 to the data pump 10 which is connected via data lines 19 to the data buffer 11.

Figure 9:
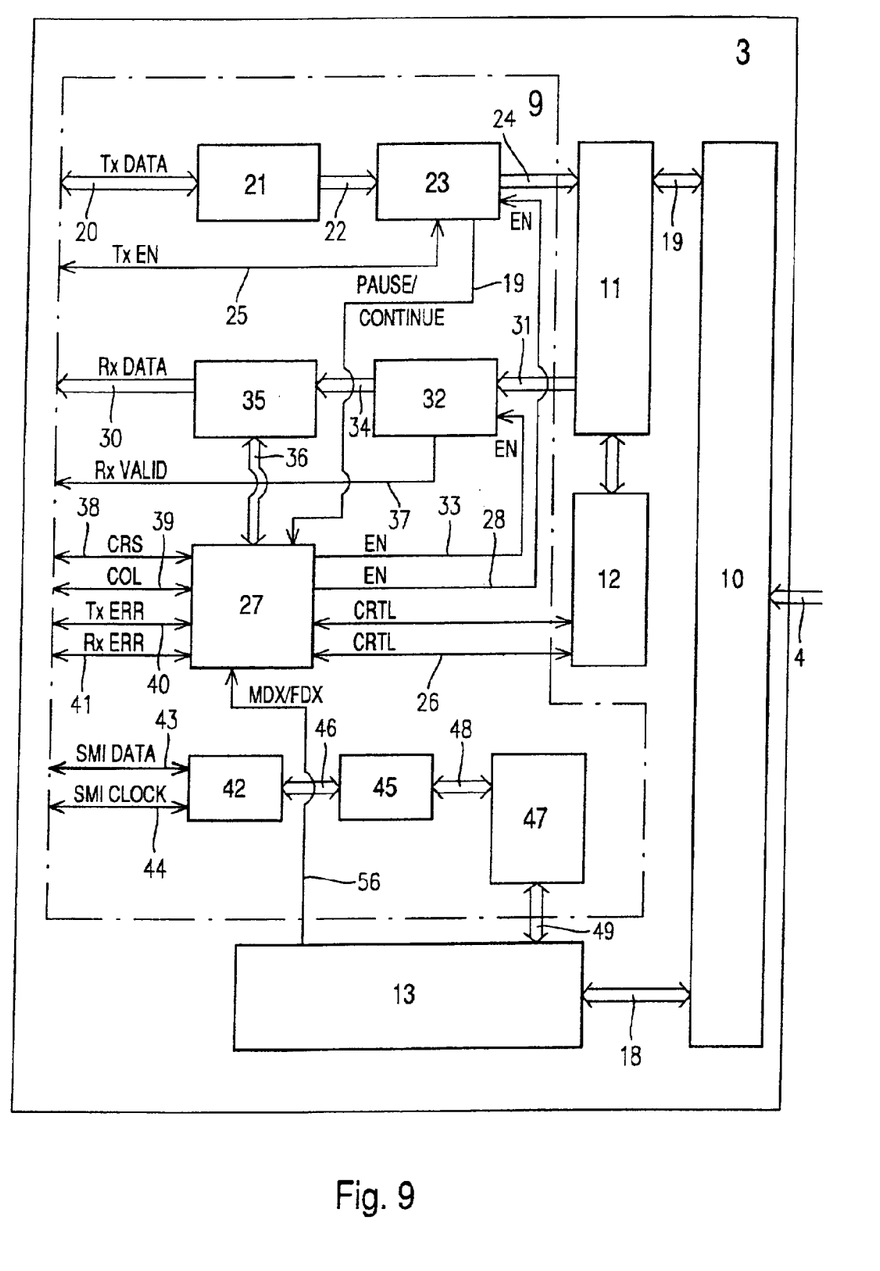
FIG. 9 a more detailed block diagram showing details of the MII interface within the Ethernet adapting apparatus according to the present invention.

FIG. 9 shows a preferred embodiment of the Ethernet adapting apparatus 3 according to the present invention in more detail.

The media independent interface 9 provides simple easy-to-implement interconnection between media access control (MAC) sublayers and physical layers for data transfer at 10 Mb/sec and 100 Mb/sec. The MII interface 9 is capable of supporting up to 100 Mb/sec rates for data transfer and of supporting management functions for physical layer devices. The data and delimiters are synchronous to clock references. Any kind of MII interface 9 can be used, such as a RMII or a SMII. The MII interface 9 provides for full duplex operation, if necessary. The media independent interface is described in detail in the IEEE standard 802.3.

The MII interface receives Ethernet data frames via data lines 20 which are converted by a converting unit 21 into data bytes. The converting unit 21 is connected via lines 22 to a write control unit 23 which checks whether sufficient memory space for at least one Ethernet data frame is in the data buffer 11. In case that there is enough memory space in the data buffer 11, the data bytes of the received data frame are stored in the data buffer 11 via lines 24. The write control unit 23 is enabled via a control line 25.

If there is not sufficient memory space in the data buffer 11, the data buffer control circuit 12 sends a control signal via a control line 26 to the flow control circuit 27 within the MII interface 9. The flow control circuit 27 sends an indicating signal to the sending device indicating that the transmission medium is not available at the moment.

If the control buffer circuit 12 sends no signal indicating that the data buffer 11 is completely full, the flow control circuit 27 enables the writing unit 23 via a control line 28 to store the supply data bytes into the data buffer 11. The writing unit 23 is counting the number of bytes stored in the data buffer and checks the data validity with a cyclic redundancy check (CRC). If the data frame is not valid, the frame is dumped and a pointer is set to the first address of the data buffer 11.

Figure 12A:
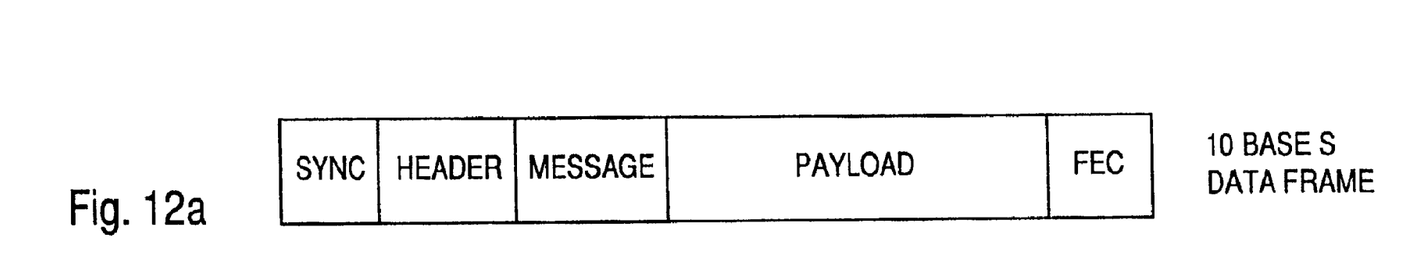
FIGS. 12a, 12b, 12c different data frame formats according to the present invention.
Figure 13:
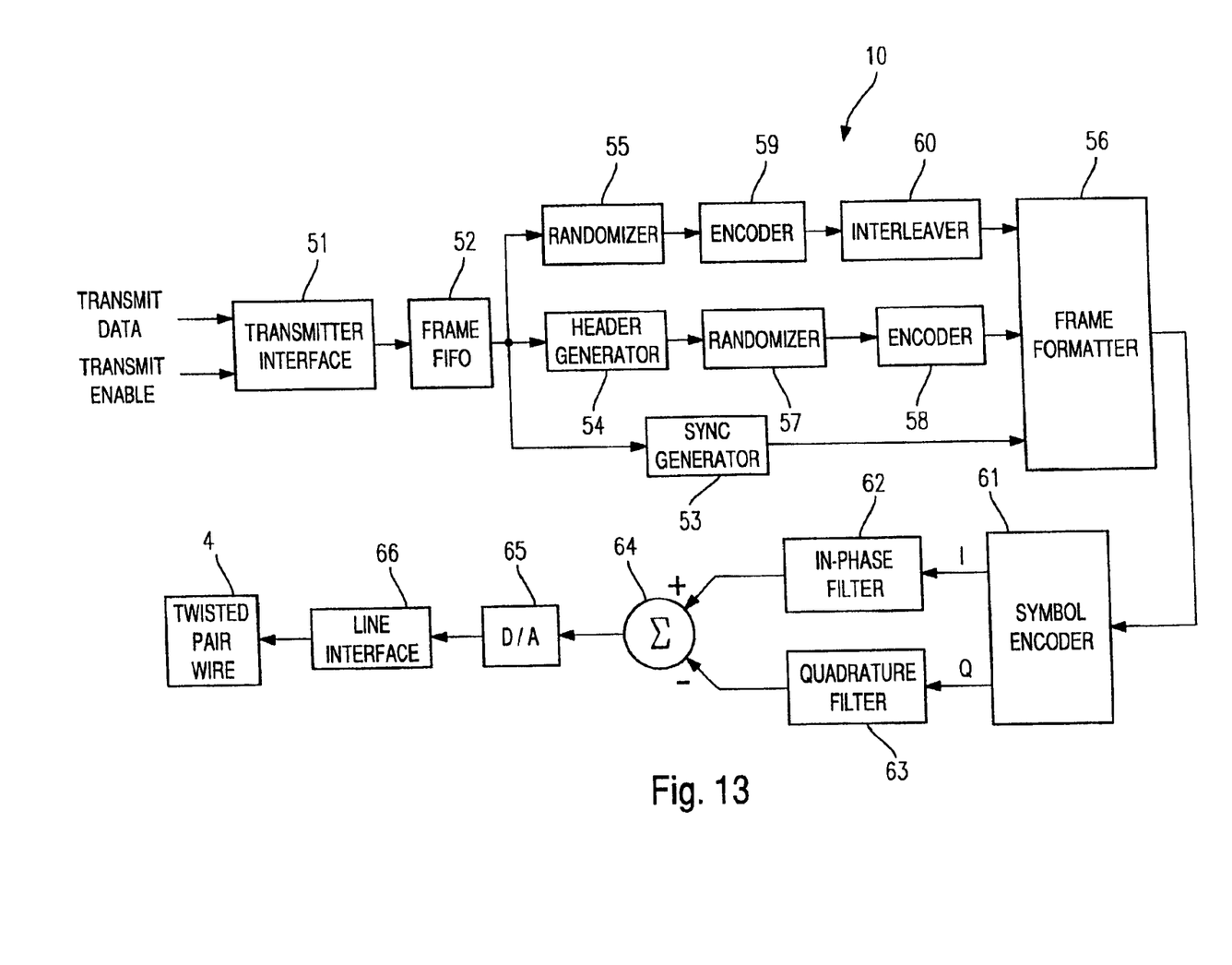
FIG. 13 a block diagram of the transmitting side of the data pump within a preferred embodiment of the Ethernet adapting apparatus according to the present invention.
Figure 14A:
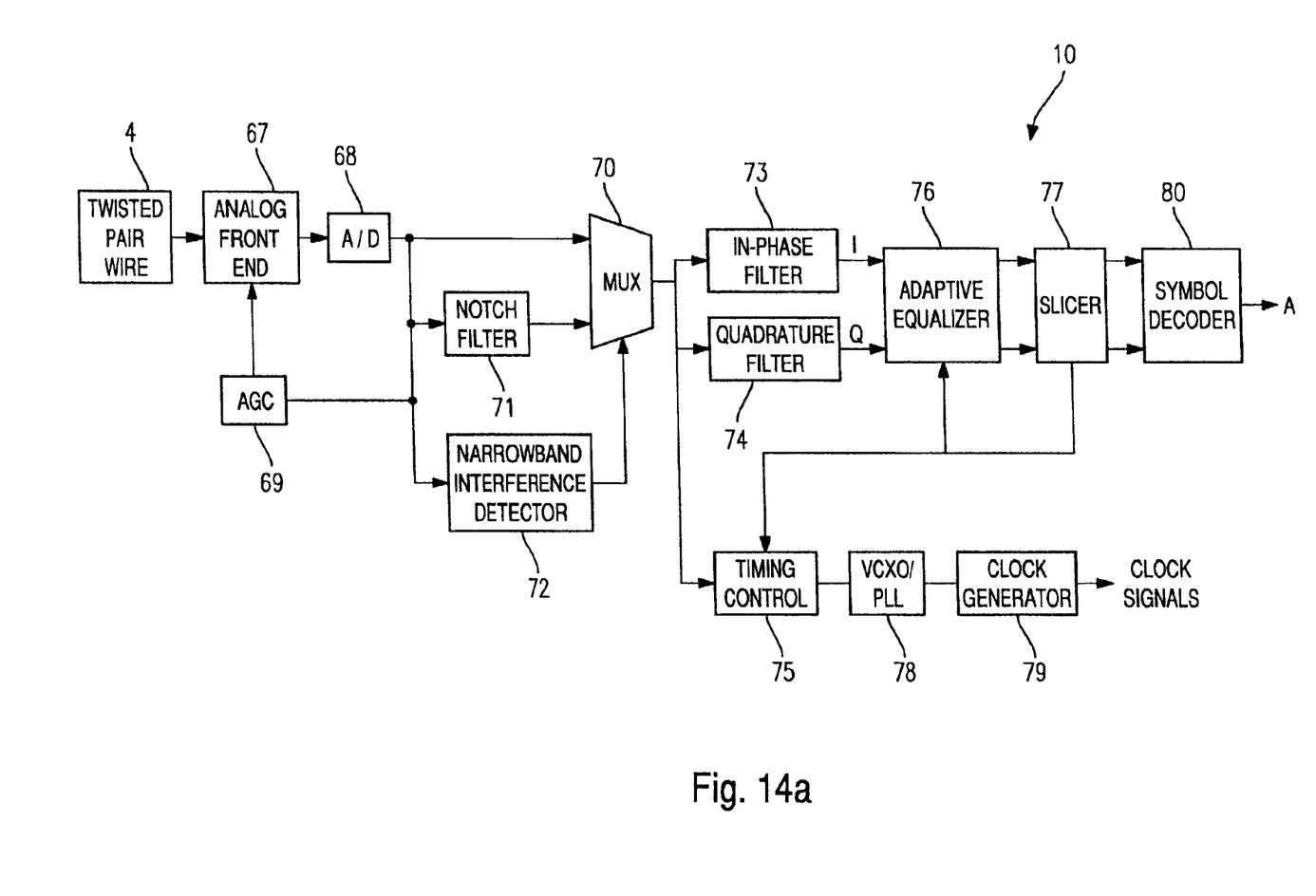
FIGS. 14a, 14b block diagrams of the receiving side of a data pump within a preferred embodiment of the Ethernet adapting apparatus according to the present invention.
Figure 14B:
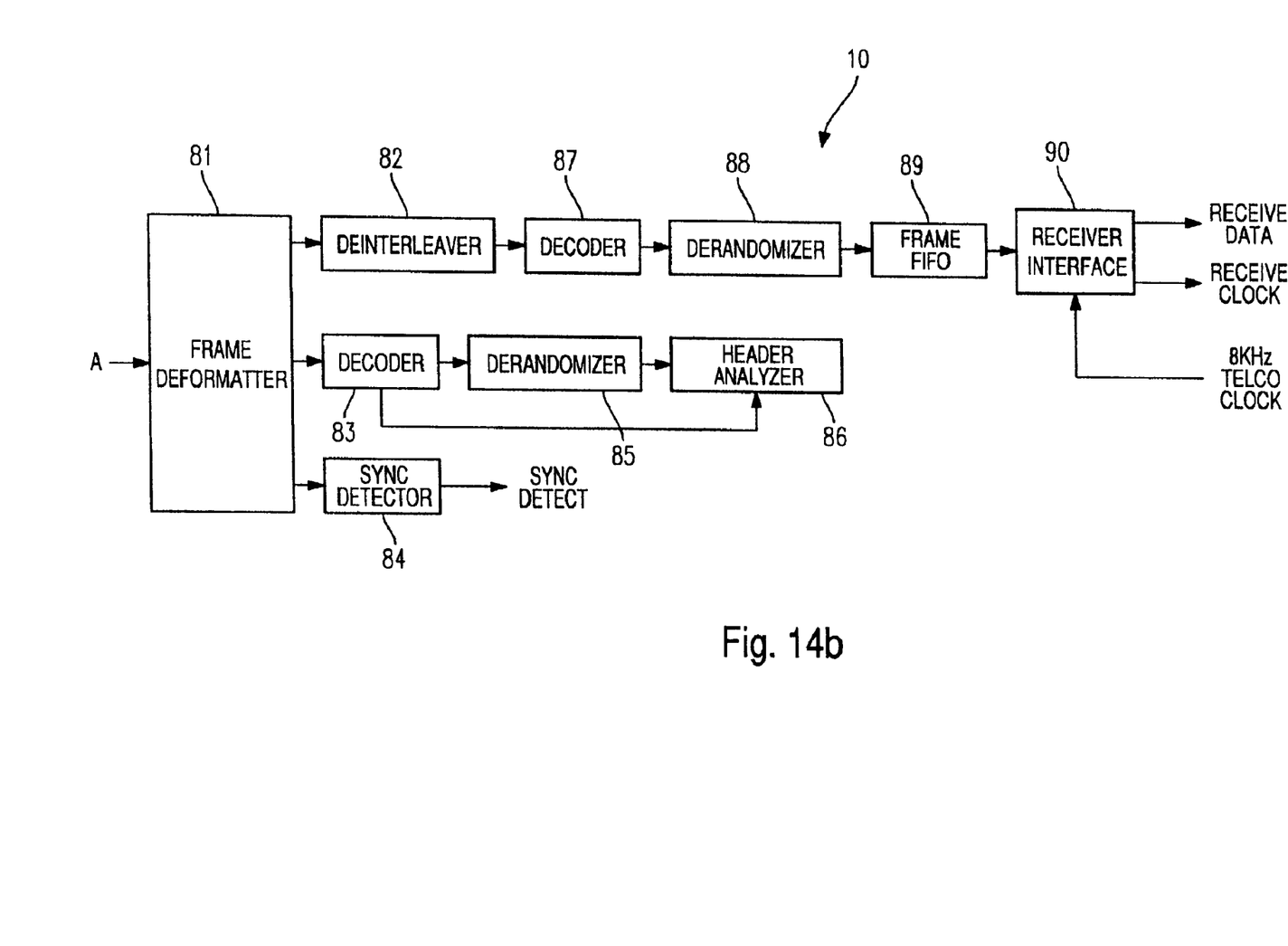

When the converted Ethernet data frame is stored in the data buffer 11, the data pump 10 sends an inquiry to the remote data buffer 11 on the other side of the telephone line 4 to check whether the remote buffer is ready to receive further data. In case that the remote data buffer is able to receive data, the write unit 23 applies a continue command via a line 29 to the local control circuit 27. Then the data pump 10 reads in the Ethernet data frame from the data buffer 11 and reframes the data to 10BaseS data frames as shown in FIG. 12a, which are sent via the telephone line 4 to the remote Ethernet adapting apparatus. In a preferred embodiment, the data pump 10 is a 10BaseS data modem as disclosed in U.S. Pat. No. 6,088,368. This 10BaseS data modem can deliver symmetrical data at approximately 13 Mbps over an unshielded, twisted pair telephone wire originally intended for bandwidths between 300 Hz and 3.4 kHz. The 10BaseS data modem comprises a modem transmitter as shown in FIG. 13, and a modem receiver as shown in FIGS. 14a, 14b. The modem transmitter of the data pump 10 performs the reframing, the encoding and the data modulation.

The data pump 10 of the remote Ethernet adapting apparatus 3 on the other side of the telephone wire 4 performs the demodulation, decoding and reframing of the received data frames. These data frames are stored unconditionally into the remote data buffer 11 of the remote Ethernet adapting apparatus 3. In the remote Ethernet adapting apparatus 3, it is checked whether the receive data line 30 is ready for data transmission. In case that a data transmission is possible, the data are read out of the data buffer 11 via data lines 31 to a reading unit 32 which is enabled by the flow control circuit 27 via control line 32. On the output side of the reading unit 32, the read-out data are supplied via lines 34 to a converting unit 35.

If the receiving data line 30 is not ready for data transmission, the flow control circuit 27 generates dummy data which are supplied to the converting unit 35 in a data line 36.

The reading unit 32 delivers an RX-valid signal via line 37. The flow control circuit 27 is further connected to a carrier sense (CRS) line 38, a collision signal line (COL) 39, a transmission error (TX-ER) line 40 and a receive error (RX-ER) line 41.

Ethernet physical devices generate a carrier sense signal (CRS) to indicate activity on the Ethernet medium. The MAC layer uses this CRS to validate receptions and to avoid a concurrent transmission in shared media configurations. The CRS is generated by the MII interface to indicate to the MAC device by the physical device that there is a legal signal on the transmission medium.

The Ethernet physical device may generate a collision signal (COL) while transmitting and when it detects another simultaneous transmission on the transmission medium. The collision signal indicates to the MAC device that the current transmission has collided with that of another station and will not be correctly received by any station. The collision signal is a signal of the MII interface 9 that indicates to the MAC device in half duplex that an incoming message collides with an outgoing message.

The transmit error signal (TX-ER) is generated by a MAC device to request that a physical device deliberately corrupt the data contents of a frame in such a manner that a receiver will detect the corruption with the highest degree of probability.

The received error signal (RX-ER) is generated by an Ethernet physical device, if a coding error or any other error that the physical device is capable of detecting was detected somewhere in the data frame presently being transferred from the physical device.

The media independent interface 9 shown in FIG. 9 is constituted by a data flow interface (DFI) comprising the converting units 21, 35, the read-and-write units 23, 32 and the data flow control circuit 27. The media independent interface 9 further comprises a serial management interface (SMI). The serial management interface is constituted by a framing circuit 42 for deframing SMI data frames supplied to the MII interface 9 via the SMI data line 43. The framing circuit 42 is further connected to a SMI clock line 44. The serial management interface (SMI) does further comprise a decoder 45 connected to the framing circuit 42 via lines 46. The serial management interface includes further a set of serial management interface registers 47 connected to the decoder 45 via lines 48 and to the central processing unit 13 via lines 49. The central processing unit 13 controls the data flow control circuit 27 within the data flow interface via control line 50 to switch between a half duplex mode (HDX) and a full duplex mode (FDX).

In the half duplex mode (HDX), the data flow control circuit 27 creates dummy data as back pressure data which are sent via the receiving data line 30 back to the data origin which might be a medium access controller or a standard Ethernet data pump, in case that the data buffer 11 is recognized to be full.

In case that the full duplex mode (FDX) is set by the central processing unit 13 via the control line 50, no dummy data are generated, but a special pause and continue frame is generated and sent back to the data origin. The procedure is based on pause/continue data packets with special source address. Pause/continue data pockets are described in the IEEE 802.3x standard.

Figure 10:
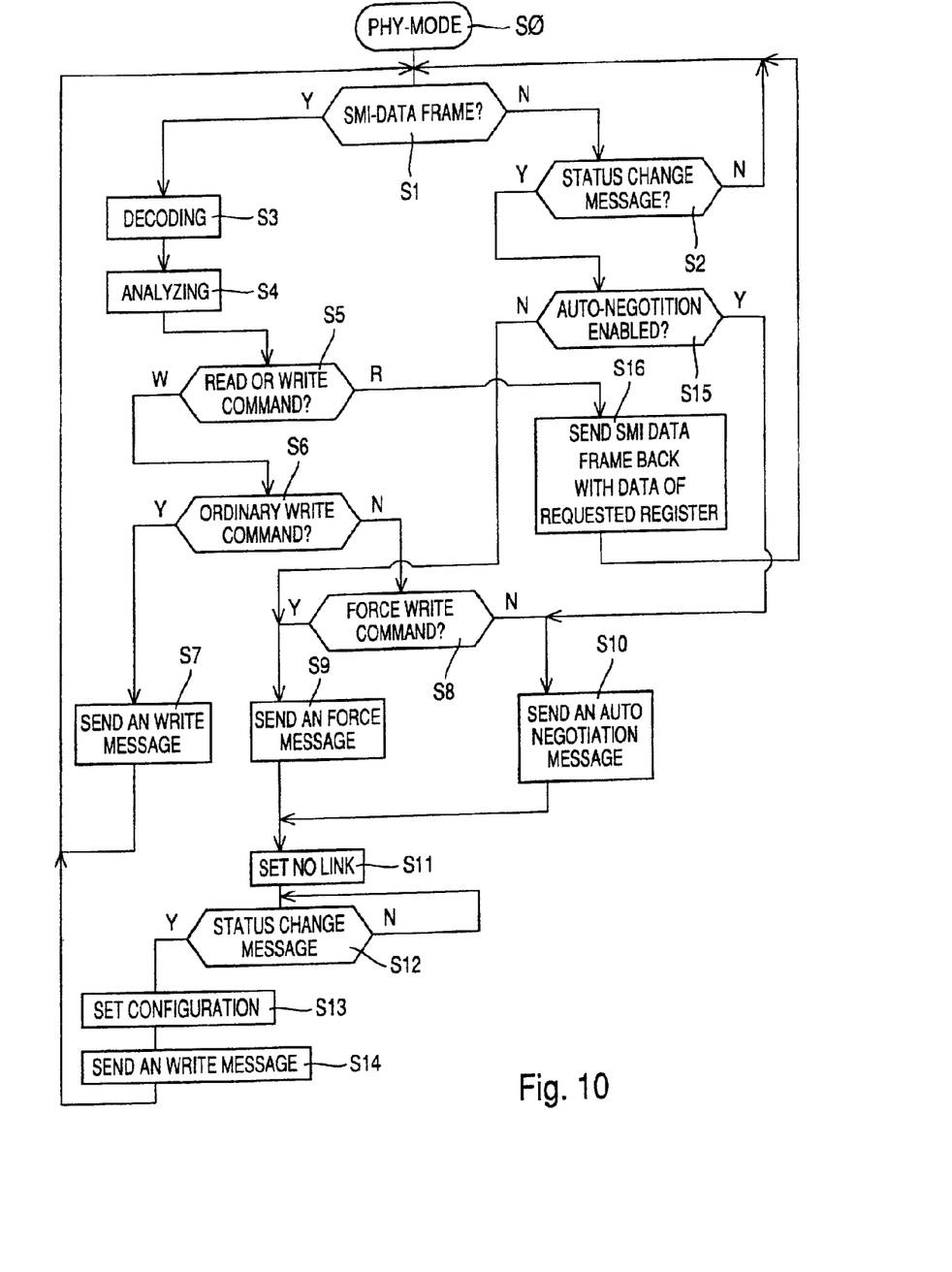
FIG. 10 a flow chart of a first mode of the dual-mode media independent interface (MII)

FIG. 10 shows a flow chart of an Ethernet adapting apparatus 3 working in the physical mode (PHY-MODE) set by the mode switching device 14. In the physical layer mode shown in FIG. 10, the Ethernet adapting apparatus 3 according to the present invention emulates a standard Ethernet data pump.

After the start in step S0, it is checked in step S1 by the MII-interface 9 whether an SMI data frame has been transmitted via the SMI data line 43. In case that no SMI data frame has been received by the decoder 42 of the SMI interface, it is checked in step S2 whether a status change message has been received. Contrary, if it is detected in step S1 that an SMI data frame has been received by the deframer 42, the SMI data frame is analyzed in step S4 by the decoder 45.

Figure 12B:
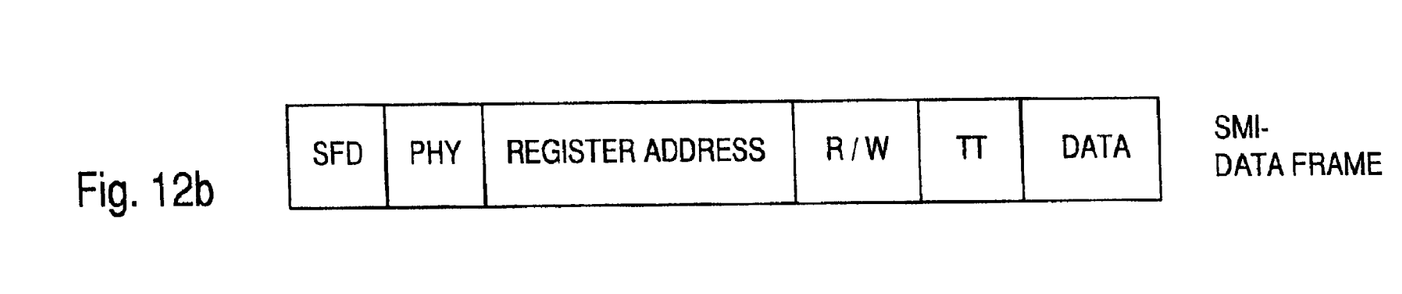

FIG. 12b shows the structure of an SMI data frame. The SMI data frame comprises a start of frame delimiter (SFD) and a five-bit address of the physical device attended by the MAC controller. A MAC controller (MAC) can attend up to 32 physical devices simultaneously. Further, the SMI data frame contains 5 bits of a register address in the physical device, such as BMCR, BMSR. Further, the SMI data frame contains 1 bit which indicates whether the MAC controller wants to write data or wants to read data. Further, there is a turn-around bit TT and 16 bits of data read by the MAC controller if the SMI data frame is a read data frame and set by the physical device if the SMI data frame is a write data frame.

Figure 12C:
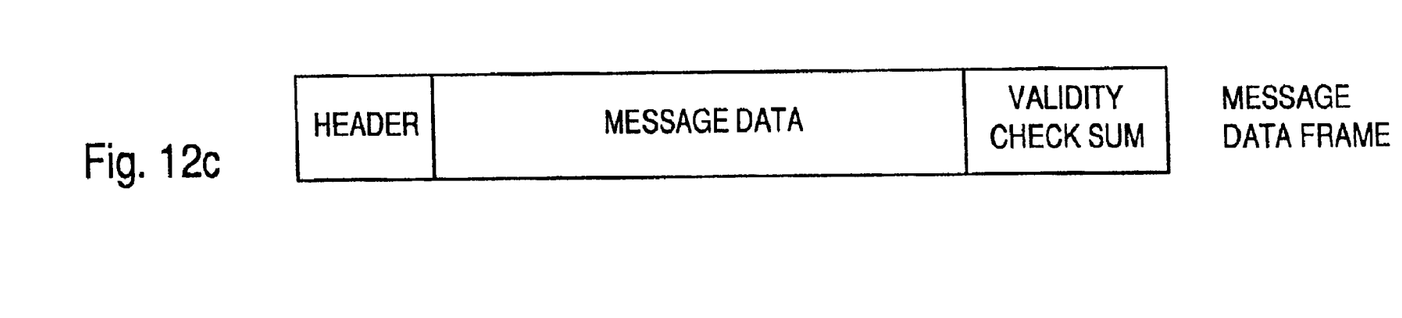

As can be seen from FIG. 10, it is checked in the physical mode in step S5 whether the received SMI data frame contains a read-or-write command by checking the read/write bit included in the SMI data frame. If the write bit of the SMI data frame is high, it is checked in step S6 whether the SMI data frame includes an ordinary write command or not. In case that it is an ordinary write command, a write message is sent in step S7 from the CPU 13 to the remote CPU 13. The format of the message is shown in FIG. 12c. The message data frame comprises a header indicating the message type and the length of the message. Further, the message data frame comprises message data and a validity check sum. There are three types of message data frames, i.e. 10BaseS link control messages, general write-or-read messages and special SMI messages. In step S7, a general write/read message is sent from the CPU 13 to the remote CPU 13 of the remote Ethernet adapting apparatus 3. In case that it is recognized in step S6 that no ordinary write command has been included in the received SMI date frame, it is checked in step S8 whether the command was a force write command. In case that the write command is a force write command, the procedure proceeds to step S9 and a force message is sent to the remote CPU 13. In the contrary case, an auto-negotiation message is sent in step S10.

In step S11, the local SMI interface is set to no link, and in step S12 it is checked whether a status change message has been received. When a status change message has been received, the local speed and the duplex mode bits of the BMCR are set according to the configuration command included in the status change message in step S13. Further, in step S14, an ordinary write message is sent from the CPU 13 to the remote CPU 13 to set a speed and duplex mode of the registers of the remote Ethernet adapting apparatus to the new configuration set in step S13. Further, the content of the registers in the register bank 47 of the Ethernet adapting apparatus 3 is mirrored to the corresponding register bank 47 of the remote Ethernet adapting apparatus 3 on the other side of the telephone line 4.

In case that in step S5 it is detected that the decoded and analyzed command is a read command, the SMI interface sends in step S15 the SMI data frame back to the data source with the data content of a register within the register bank 47 as requested.

The register bank 47 within the MII interface 9 comprises at least 5 obligatory registers. These registers are a command register, a status register and an identification code register, a negotiation advertisement register and auto-negotiation partner ability register. The command register (BMCR) comprises 5 bits. The first bit sets the speed to 100 Mbps or 10 Mpbs, the second bit sets the duplex mode to half duplex or full duplex, the third bit is a reset command, the fourth bit enables or disables the auto-negotiation procedure and the fifth bit restarts the auto-negotiation procedure.

The status register comprises 4 bits, wherein the first bit indicates the actual data transfer speed, the second bit indicates the actual duplex mode, the third bit indicates the link status and the fourth bit indicates whether the auto-negotiation procedure is complete or not.

In the identification code register, an identification code is stored being unique identifies for a particular type of Ethernet.

In the negotiation advertisement register, it is indicated whether the physical device is capable to work in 10 Mbpshalf duplex, 100 mbs half duplex, 10 mbs full duplex, 100 Mbpsfull duplex, and whether the physical device supports the pause/continue procedure according to IEEE 802.3x.

The auto-negotiation partner ability register is similar to the negotiation advertisement register and reflects the partner abilities as advertised by the communication partner device.

If in step S2 it is detected that no status change message has been received, it is checked in step S15 whether auto-negotiation has been enabled or not. If the auto-negotiation has been enabled, the procedure continues with step S10. The auto-negotiation procedure between two Ethernet physical layer devices aims to find the highest available mode of operation that can be supported by those Ethernet physical layer devices. The auto-negotiation procedure provides a link device with the capability to detect the modes of operation supported by the device at the other end of the data link, determine common abilities and to configure for joint operation. The auto-negotiation procedure instructs the Ethernet physical device to perform auto-negotiation and then calibrates all data path operations and data procedures. The auto-negotiation procedure can be disabled by the MAC layer device. When the auto-negotiation procedure is disabled, the Ethernet physical layer device is forced to the configuration indicated by the MAC layer.

Figure 11:
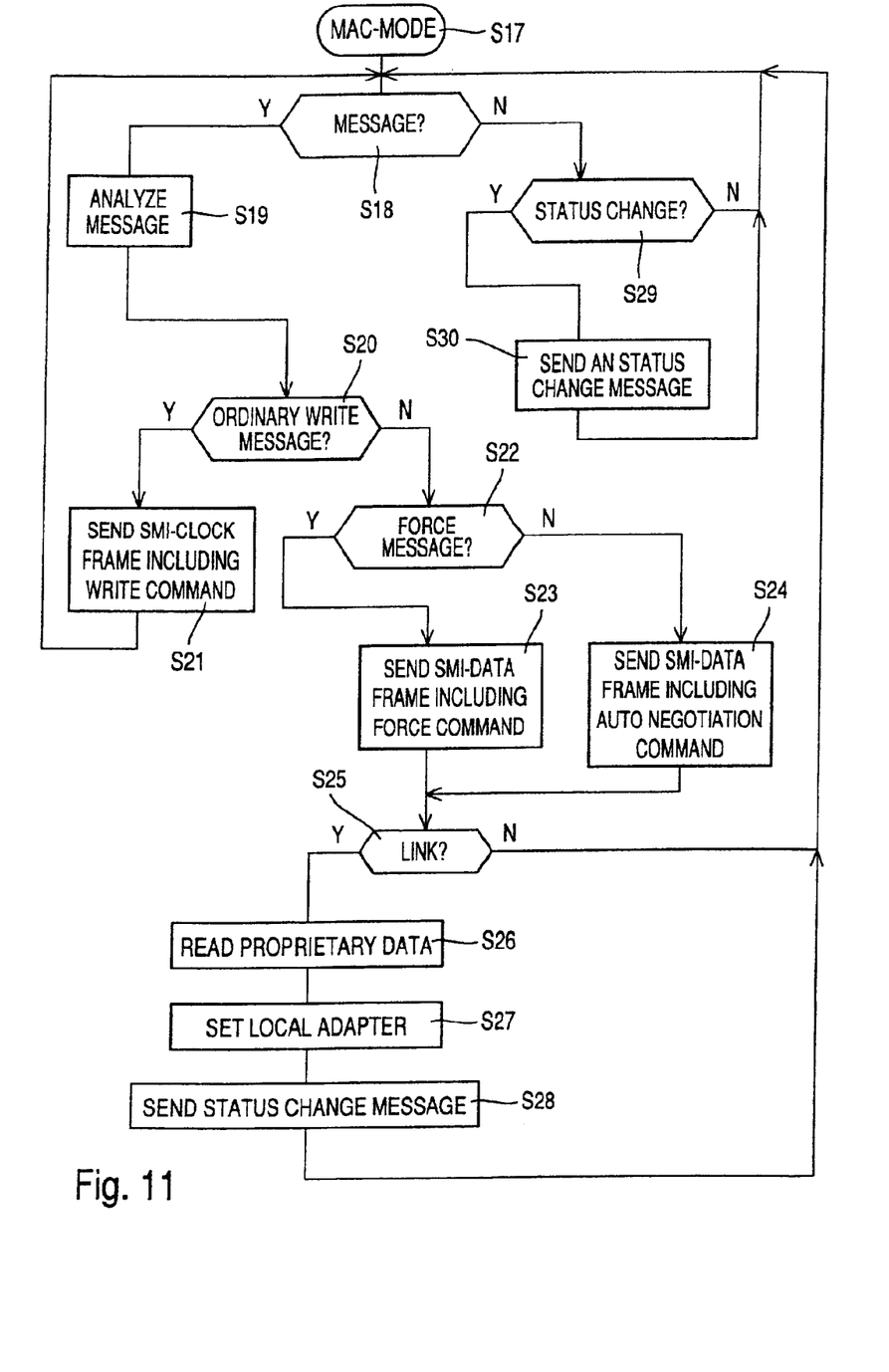
FIG. 11 a second mode of the dual-mode media independent interface (MII) of the Ethernet adapting apparatus according to the present invention.

FIG. 11 shows a further flow chart of an Ethernet adapting apparatus 3 according to the present invention working in the medium access control mode (MAC-mode). After a start step S17, it is checked in step S18 whether a message from the physical layer device has been received or not. If the answer is yes, the received message is analyzed in step S19. In step S20, it is checked whether the message is an ordinary write message or not. In case that it is an ordinary write message, an SMI data frame including the write command is generated and sent in step S21. In the contrary case, it is detected whether the analyzed message is a force message or not in step S22. If the received message is a force message, an SMI data frame is generated including the force command and sent in step S23. Otherwise, it is decided in step S22 that the received message is an auto-negotiation message, and a corresponding SMI data frame including an auto-negotiation command is generated and sent in step S24.

In step S25, it is detected whether an Ethernet link is provided or not. If yes, proprietary information data is read from aa register of the Ethernet physical device in step S26, and the local Ethernet adapting apparatus 3 is set in step S27 to support the data transfer speed, the duplex mode according to the proprietary duplex mode data read in step S26. In a further step S28, a status change message is sent from the MAC-mode device to the central processing unit of the remote device.

In case that in step S18 it is detected that no message has been received, it is checked in step S29 whether a status change has occurred. In case that a status change is detected in step S29, a status change message is sent in step S30 to the new status stored in the registers.

In a preferred embodiment, the Ethernet adapting apparatus 3 according to the present invention as shown in FIG. 8 comprises a 10BaseS data modem 10 as a data pump. The 10BaseS data modem 10 comprises a modem transmitter as shown in FIG. 13 and a modem receiver as shown in FIGS. 14a, 14b. The data source feeding the modem 10 supplies a transmit data signal and a transmit enable signal to a transmitter interface 51 of the 10BaseS data modem. The transmit interface inputs digital data to a FIFO device 52. The FIFO functions to adjust the rate of data transfer between the data source and the data modem itself. The FIFO device 52 compensates the differences in the data rates between the two devices. The signal output of the FIFO device 52 is input to a sync generator 53, a header generator 54 and a randomizer 54. The sync generator 53 generates and outputs two sync bytes to a frame formatter 56. The header generator 54 generates header information spanning a plurality of bytes. The header information is then randomized or scrambled by a randomizer 57 and subsequently encoded by an encoder 58. The output signal of the encoder 58 is input to the frame formatter 56.

The data from the frame FIFO device 52 is further input to a scrambler or randomizer 55 which scrambles the data. The output of the randomizer 55 is connected to an encoder 59 which encodes the data stream. An encoded data stream is output to an interleaver 60 which in combination with a Reed Solomon encoding shuffles the data to overcome impulse type noise thus resulting in improved error recovery. The output of the interleaver 60 is input to the frame formatter 56.

The frame formatter 56 samples a complete data frame comprising sync, the header data and the data stream output from the interleaver 60. The frame formatter 56 is connected to a symbol encoder 61. The symbol encoder 61 generates an in-band I and a quadrature Q digital output signal from the basis of the input digital data stream. The I and Q channels are input to an in-phase filter 62 and a quadrature filter 63. The output of the quadrature filter 63 is subtracted from the output of the in-band filter 62 by means of the subtracting device 64. The output signal of the subtracting device is converted by means of a digital analogue converter 65, the output of which is connected to a line interface 66. The line interface 66 transmits the output signal via a twisted pair telephone line 4.

FIGS. 14a, 14b show the modem receiver side of the 10BaseS data modem 10 used in a preferred embodiment of the Ethernet adapting apparatus 3 according to the present invention. The twisted pair wire 4 is coupled to an analogue front end 67 which is provided to interface the data modem 10 to the telephone line 4 and to amplify the received analogue signal. The output of the analogue front end 67 is connected to an analogue digital converter 68. The output of the analogue digital converter 68 is input to an automatic gain control 69. The output of the digital converter 68 is further coupled to a multiplexer 70, a notch filter 71 and a narrowband interference detector 72. The output of the notch filter 32 is connected to the second input of the multiplexer 70. The narrowband interference detector 72 detects the presence of an amateur radio signal which lies in the frequency range of 1.82 MHz. If sufficient signal levels in the amateur radio band are detected in the received signal, the multiplexer 70 is set to switch the output of the notch filter 71 through. The center frequency and the bandwidth of the notch filter 71 is set to cover the amateur radio band. The output of the multiplexer 70 is input to an in-phase filter 73, a quadrature filter 74 and a timing control circuit 75. The in-phase and quadrature signals output via the in-phase and quadrature filters 73, 74 are input to an adaptive equalizer 76. The in-phase and quadrature signals output by the adaptive equalizer 76 are input through a slicer 77 which generates a feedback signal to control the adaptive equalizer 76 and the timing control circuit 75. The timing control circuit 75 outputs a signal to a voltage controlled crystal oscillator/phase locked loop 78. The output of the phase-locked loop 78 input to a clock-generating circuitry 79 which generates clock signals used internally by the modem 10. The I and Q output signals of the slicer 77 are input to a symbol decoder 80. The symbol decoder 80 makes a best determination from among the constellation points according to the I and Q input signals. The data bits represented the detected symbol are output by the symbol decoder 80 and input to a frame deformatter 81 shown in FIG. 14b. The frame deformatter 81 is coupled to a deinterleaver 82, a decoder 83 and a sync detector 84. The sync detector 84 matches the sync pattern and searches for multiple sync occurrences in the input data stream. Once a sync signal is detected, the header data is read from the frame by the frame deformatter 81 and input to the decoder 83. The output of the decoder 83 is input to a derandomizer 85. The output of the decoder 83 and the derandomizer 85 is supplied to a header data analyzer 86. The header data is analyzed to detect missing frames, perform addressing functions, etc.

The frame deformatter 81 outputs further a data stream to the deinterleaver 82 which deshuffles the received data. The output of the deinterleaver 82 is input to a decoder 87. The output of the decoder 87 is supplied to a derandomizer 88 which descrambles the received data. The output of the derandomizer 88 is input to the frame FIFO device 89 which adjusts for the differences of the data rates between the modem 10 and the communication device connected to the modem. The output of the frame FIFO device 89 is input to a receive interface circuit 90 which outputs the receive data signal. The receive clock generated by the data device connected to the modem 10 is input to the receive interface and functions to provide a clock signal for the receive data.

The Ethernet adapting apparatus 3 according to the present invention is an extending device between a second layer of communication and a first layer of communication according to the Ethernet standard. The Ethernet adapting apparatus 3 uses all Ethernet tools such as COL, CRS at the second layer side to enhance performance of buffer and data flow. The CRS signal and the COL signal are imitated to emulate the standard Ethernet data pump in the physical mode and to emulate an Ethernet medium access controller in the MAC mode.

The mirroring of the register contents of the SMI interface over a link makes it possible to let the MAC layer and the Ethernet physical layer operate normally without notice that a new telecommunication medium 4 is provided between the Ethernet medium access control (MAC) on the one side and the Ethernet data pump on the other side. By using special messaging protocols over the new telecommunication medium 4, it is possible to share information such as load balance, SMI activities, auto-negotiation, data link, speed duplex mode, etc. Auto-recognition of the Ethernet physical layer device makes it possible to use its proprietary speed detector. The new telecommunication medium 4 may be used for other applications simultaneously.

What is claimed is:

1. An Ethernet adapting apparatus for data transfer between a standard Ethernet data pump and an Ethernet medium access controller via telecommunication medium, comprising:

(a) a dual mode media independent interface which emulates in a PHY-mode the standard Ethernet medium access controller and which emulates in a MAC-mode the Ethernet medium access controller;

(b) a switching device for setting the dual mode media independent interface in the PHY-mode or in the MAC-mode;

(c) a data buffer for storing at least one Ethernet data package to be transferred between the standard Ethernet data pump and the Ethernet medium access controller; and (d) a 10BASES® data modem connected to the telecommunication medium, wherein the 10BASES® data modem reframes the data stored in the data buffer to 10BASES® data frames sent via the telecommunication medium; and wherein the dual mode media independent interface comprises a serial management interface connectable via a SMI-data line to an Ethernet medium access controller or a standard Ethernet data pump for the exchange of SMI-data frames including SMI-messages, and a data flow interface connectable via a data bus to an Ethernet medium access controller or a standard Ethernet data pump for the exchange of Ethernet data packages.

2. The Ethernet adapting apparatus according to claim 1, wherein the telecommunication medium is a telephone line.

3. The Ethernet adapting apparatus according to claim 1, wherein the serial management interface circuit comprises:

a deframing circuit for deframing the SMI data frames supplied via the SMI data line, a decoder for decoding the SMI messages, and a set of SMI registers.

4. The Ethernet adapting apparatus according to claim 3, wherein the SMI registers comprise at least:

a command register, a status register, an identification code register, a negotiation advertisement register, and an auto-negotiation partner ability register.

5. The Ethernet adapting apparatus according to claim 1, wherein the serial management interface is connected to a central processing unit.

6. The Ethernet adapting apparatus according to claim 1, wherein the data flow interface circuit is connected via control lines to a data buffer control circuit.

7. The Ethernet adapting apparatus according to claim 1, wherein the telecommunications medium is a wireless telecommunications channel.

8. The Ethernet adapting apparatus according to claim 1, wherein the telecommunication medium is an optical telecommunication channel.

9. The Ethernet adapting apparatus according to claim 3, wherein the register content of any SMI-register is mirrored.

* * * * *